United States Patent [19]
Sakurada et al.

[11] Patent Number: 5,805,917
[45] Date of Patent: Sep. 8, 1998

[54] PARALLEL PROCESSING SYSTEM WITH A PLURALITY OF COMMUNICATION REGISTER MODULES

[75] Inventors: Keiko Sakurada; Noriyuki Ando, both of Tokyo, Japan

[73] Assignee: NEC Corporation, Tokyo, Japan

[21] Appl. No.: 489,721

[22] Filed: Jun. 13, 1995

[30] Foreign Application Priority Data

Jun. 14, 1994 [JP] Japan .................................. 6-131733
May 11, 1995 [JP] Japan .................................. 7-113321

[51] Int. Cl.$^6$ .............................. G06F 15/76; G06F 12/06
[52] U.S. Cl. ............................... 395/800.04; 395/200.44; 395/405; 395/484
[58] Field of Search ........................ 395/200.03, 200.15, 395/200.2, 726, 569, 570, 561, 562, 800.04, 800.06, 800.32, 800.33, 200.41, 200.44, 200.45, 484, 405; 340/825.79

[56] References Cited

U.S. PATENT DOCUMENTS

| | | | |
|---|---|---|---|
| 4,574,350 | 3/1986 | Starr ...................................... | 364/200 |
| 4,636,942 | 1/1987 | Chen et al. ........................... | 364/200 |
| 4,733,346 | 3/1988 | Tanaka .................................. | 364/200 |
| 4,901,230 | 2/1990 | Chen et al. ........................... | 364/200 |
| 4,918,600 | 4/1990 | Harper, III et al. .................... | 364/200 |
| 4,926,317 | 5/1990 | Wallach et al. ....................... | 364/200 |
| 4,949,243 | 8/1990 | Mohamed Ali et al. ............... | 395/405 |
| 5,165,039 | 11/1992 | Niehaus et al. ....................... | 395/800 |
| 5,168,573 | 12/1992 | Fossum et al. ....................... | 395/800 |
| 5,251,323 | 10/1993 | Isobe ..................................... | 395/800 |
| 5,408,671 | 4/1995 | Tanaka .................................. | 395/800 |
| 5,414,864 | 5/1995 | Koizumi ................................ | 395/775 |
| 5,450,313 | 9/1995 | Gilbert et al. ......................... | 364/133 |
| 5,561,784 | 10/1996 | Chen et al. ........................... | 395/484 |
| 5,590,326 | 12/1996 | Manabe ................................. | 395/477 |
| 5,615,348 | 3/1997 | Koino et al. .......................... | 395/800.32 |
| 5,615,374 | 3/1997 | Sadoi et al. ........................... | 395/726 |

*Primary Examiner*—Mark H. Rinehart
*Attorney, Agent, or Firm*—Whitham, Curtis, Whitham & McGinn

[57] ABSTRACT

A parallel processing system includes a plurality of processors, a plurality of communication register modules each including a communication register, and an interconnecting network for connecting the plurality of processors and the plurality of communication register modules. The interconnecting network receives and simultaneously transmits first and second accesses from first and second processors of the plurality of processors to first and second communication register modules of the plurality of communication register modules, respectively. Each of the plurality of communication register modules may include a communication register set. The communication register set includes the communication register. The communication register set may include a lock bit. Each of the plurality of communication register modules may include a test and set part.

9 Claims, 6 Drawing Sheets

PARALLEL PROCESSING SYSTEM WITH A PLURALITY OF COMMUNICATION REGISTER MODULES

BACKGROUND OF THE INVENTION

The present invention relates to a parallel processing system including a plurality of processors, and more particularly to a parallel processing system including a communication register.

"Synchronous control" refers to a control for synchronizing instruction execution timing among the processors. The synchronous control includes the post/wait synchronization and the barrier synchronization.

"Exclusive control" refers to a control for allowing only one processor to execute a sequence of operations in a program at a time and for excluding other processors from the execution at the same time.

"Synchronous/exclusive control" refers to the synchronous control and/or the exclusive control.

A "critical section" is a code segment in a program which must be executed by only one processor at a time.

A "shared register" refers to a register which can be accessed by a plurality of processors.

A "communication register" refers to a shared register having a faster access time or a higher throughput, or both, compared with the main memory. The communication register may be used for communication control between an input/output device and processors, communication control among the input/output devices, communication control among the processors, or the synchronous/exclusive control among the processors.

The synchronous/exclusive control is necessary to perform parallel processing among a plurality of processors. Generally, the performance of an array handling greatly depends on the synchronous/exclusive control.

One way for improving the synchronous/exclusive control is introducing a shared register to reduce the overhead of the synchronous/exclusive control. U.S. Pat. No. 4,636, 942 discloses a parallel processing system including a shared register for the synchronous/exclusive control.

Referring to FIG. 2 and lines 47–51 of column 6 of the reference, the system includes CPU 1 and CPU 2 as processors and semaphore registers 160 as a shared register for an exclusive control. The system further includes shared registers 200 for storing shared variables.

In the system disclosed in U.S. Pat. No. 4,636,942, only one CPU can access the semaphore register 160 at a time. This access limitation deteriorates the system performance because both of the CPUs frequently access the semaphore register 160 during the synchronous/exclusive control.

This problem becomes more serious when a synchronous control for a plurality of tasks is to be executed because a plurality of lock bits corresponding to the tasks are located in the semaphore registers 160 and this increases the frequency of accessing the semaphore registers 160.

SUMMARY OF THE INVENTION

In view of the above problems of the conventional parallel processing system, an object of the present invention is to reduce the contention for the communication register (e.g., shared register) between the processors. Specifically, the present invention reduces the contention occurring in and during the synchronous/exclusive control.

Another object of the present invention is to allow a plurality of processors to access the communication registers simultaneously.

Yet another object of the present invention is to allow simultaneous access to both lock bits and data (e.g., counters) located in the communication registers.

Another object of the present invention is to reduce the contention for communication registers between tasks executed in processors.

Another object of the present invention is to reduce the contention for communication registers between a processor accessing a lock bit and a processor accessing data corresponding to the lock bit. The communication register set may further include a counter value and/or data.

Another object of the present invention is to provide address assignments adapted to prevent the aforementioned contentions.

A parallel processing system according to the present invention comprises a plurality of processors, a plurality of communication register modules each including a communication register, and an interconnecting network for connecting the plurality of processors and the plurality of communication register modules. The interconnecting network receives and simultaneously transmits first and second accesses from first and second processors of the plurality of processors to first and second communication register modules of the plurality of communication register modules, respectively.

Each of the plurality of communication register modules may include a communication register set. The communication register set comprises the communication register. The communication register set may include a lock bit. Each of the plurality of communication register modules may include a test and set part.

The addresses of the communication register may be assigned in a sequential, parallel, interleaving, or rotating order.

An exclusive control method according to present invention is executed in the aforementioned parallel processing system.

In the method, first and second lock bits of first and second tasks are stored into first and second communication register modules, respectively. The first and second lock bits may be accessed simultaneously and independently by first and second processors, respectively.

In a modification of the method, a lock bit and data of a task is stored into first and second communication register modules, respectively. The lock bit and the data may be accessed simultaneously and independently by first and second processors, respectively.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Figure 1:
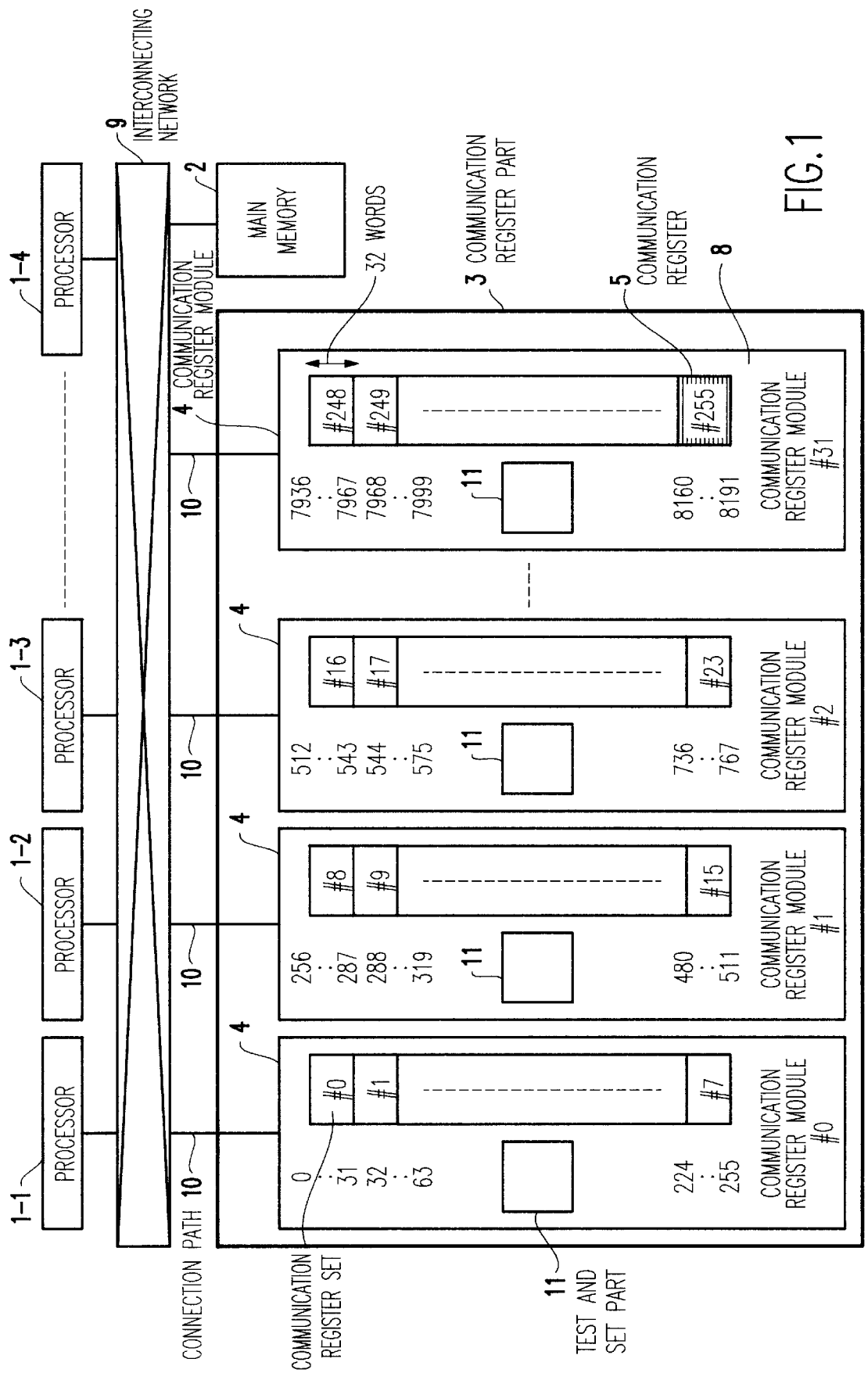
FIG. 1 is a block diagram of a parallel processing system according to a first embodiment of the present invention.

Referring to FIG. 1, a parallel processing system according to the first embodiment of the present invention comprises a plurality of processors 1—1 to 1–L, a main memory 2, a communication register part 3, an interconnecting network 9 mutually interconnecting the aforementioned elements, and a connection path 10 connecting the interconnecting network 9 and the processors 1—1 to 1–N.

The communication register part 3 includes a plurality of (e.g., 32) communication register modules 4. The communication register modules 4 are referred to as communication register module #0 to #31.

The interconnecting network 9 transmits accesses to different communication register modules simultaneously and independently. More specifically, the interconnecting network 9 transmits an access request from the processor 1–m to the communication register module #n, and an access request from the processor 1–m' to the communication register module #n'(m≠m', n≠n'), simultaneously and independently. Full-crossbar switch networks, omega networks, and multi-stage interconnection networks can be used as the interconnecting network 9. The details of these interconnecting networks are described in John P. Hayes, *COMPUTER ARCHITECTURE AND ORGANIZATION* second edition, McGraw-HILL, New York, 1988, and Kai Hwang, *ADVANCED COMPUTER ARCHITECTURE*, McGraw-Hill, New York, 1993.

Each of the communication register modules 4 has a test and set part 11 for implementing a test and set instruction. The test and set instruction is designed to be indivisible in the sense that all the steps of its instruction cycle must be completed without interference by other instructions. The details of the test and set instruction are described in John P. Hayes, *COMPUTER ARCHITECTURE AND ORGANIZATION* second edition, McGraw-HILL, New York, 1988, and Kai Hwang, *ADVANCED COMPUTER ARCHITECTURE*, McGraw-Hill, New York, 1993.

Each of the communication register modules 4 includes plurality of (e.g., 256 words) of communication registers. Each of the communication registers is 32 bits wide. Each communication register is assigned a unique address.

Figure 2:
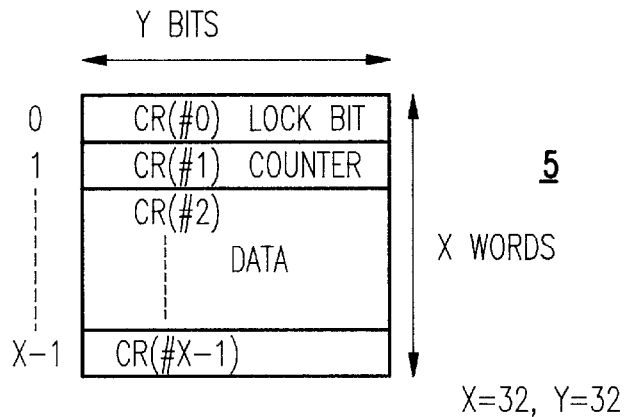
FIG. 2 shows the structure of a communication register set shown in FIG. 1.

Referring to FIG. 2, a communication register set 5 is composed of 32 communication registers CR(#0) to CR(#31). CR(#0) to CR(#31) have contiguous addresses. That is, the address of CR(#n) is $\alpha+n$ where $\alpha$ is the address of CR(#0).

CR(#0) is a lock bit used for the exclusive control. CR(#1) is a counter used for the synchronous control. Specifically, the counter CR(#1) stores the number of processors which reach a synchronization point. CR(#2) to CR(#31) store data. Referring again to FIG. 1, the communication register modules #0 to #31 include 256 communication register sets #0 to #255.

When entering a critical section, the processor 1 tests the value of the lock bit CR(#0). If the value is not "0", the processor waits until the value becomes "0". If the value is "0", the processor sets the value of the lock bit to "1" and enters the critical section. This setting is referred to as "locking". "Lock acquisition" refers to setting the value of the lock bit to "1" and entering the critical section after the value of the lock bit is confirmed to be "0".

The aforementioned testing and setting operation is implemented by a test and set instruction. The test and set instruction is executed indivisibly by the test and set parts 11 in the communication register modules 4.

The test and set instruction makes the critical section exclusive. That is, only one processor is allowed to enter the critical section at a time and other processors are excluded from entering into the critical section.

When a plurality of tasks are executed by the plurality of processors 1—1 to 1–L, different tasks are assigned to different communication register sets. Hence, one communication register set corresponds to only one task.

The aforementioned parallel processing system can be embodied in various forms depending on the address assignment of the communication registers in the communication register modules 4.

In the first embodiment, the addresses of the communication registers are given below:

$$A(m,p)=N*(m-1)+(p-1) \quad \cdots (1)$$

where $A(m,p)$ is the address of the p-th communication register of the m-th communication register module (communication register module #(m-1)), and N (=256) is the number of communication registers included in a communication register module 4.

In this specification, this kind of assignment is referred to as an assignment "in a sequential order".

According to the address assignment in a sequential order, the i-th communication register (CR(#i-1)) of the j-th communication register set (#(j-1)) corresponds to the B(i,j)-th word of the C(i,j)-th communication register module. The B(i,j) and C(i,j) are given below:

$$B(i,j)=R+i \quad \cdots (2)$$
$$c(i,j)=Q+1 \quad \cdots (3)$$

where $W*(j-1)=Q*M*W+R$ (Q and R are integers, $0 \leq R < M$), and W (=32) is the number of communication registers included in a communication register set.

Figure 3:
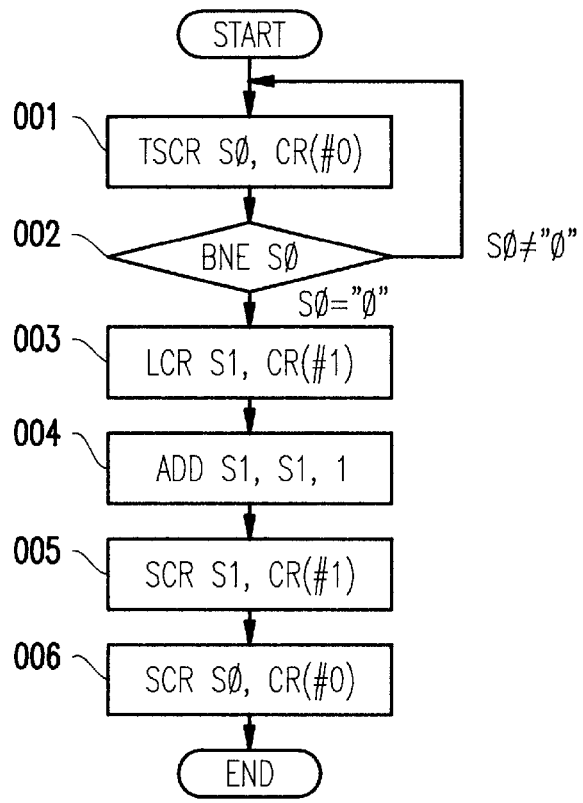
FIG. 3 is a flowchart showing steps of an exclusive control executed in the parallel processing system shown in FIG. 1.

Referring to FIG. 3, next is described steps of the synchronous/exclusive control executed in the aforementioned parallel processing system referring to an exemplary program. The exemplary program employs a test and set instruction for the exclusive control.

The exemplary program increments the value of the counter CR(#1). This operation is a critical section operation and must be executed exclusively. When all of the processors 1—1 to 1–L complete the operation, the value of CR(#1) is equal to the number of the processors. The exemplary program is listed below.

| 001 loop1: | TSCR S0, CR(#0) |
|---|---|
| 002 | BNE S0, loop1 |
| 003 | LCR S1, CR(#1) |
| 004 | ADD S1, S1, 1 |
| 005 | SCR S1, CR(#1) |
| 006 | SCR S0, CR(#0) |

The line 001 is the test and set instruction. The lines 003 to 005 are the critical section. The line 006 is resetting of the lock bit. The operation of each instruction is described below.

"TSCR S0, CR(#0)" on line 001 is a test and set instruction to read the value of the communication register CR(#0) into a scalar register S0, and change the CR(#1) to "1" if CR(#0) is "0".

"BNE S0, loop1" on line 002 is a branch instruction to allow the processor to proceed to line 3 if the value of S0 is 0, and to return the processor to line 1 otherwise. The lines 001 and 002 constitute a binary spin lock.

"LCR S1, CR(#1)" on line 003 is a load instruction to read the value of the communication register CR(#1) into a scalar register S1.

"ADD S1, S1, 1" on line 004 is an addition instruction to add 1 to the scalar register S1, and write it back to S1.

"SCR S1, CR(#l)" on line 005 is a store instruction to store the value of the scalar register S1 into the communication register CR(#1).

"SCR S0, CR(#0)" on line 006 is a store instruction to store the value of the scalar register S0 (=0) into the communication register CR(#0).

In this example, the processors 1—1 to 1–L repeat the test and set instruction until the value of the lock bit CR(#0) becomes "0". When the CR(#0) is confirmed to be "0", the processor enters the critical section. That is, the processor acquires a lock.

After lock acquisition, the processor adds 1 to the counter CR(#1). The synchronous control is completed when the value of the counter reaches the number of the processors 1 (=L). Thus, the synchronous control is completed when all of the processors 1—1 to 1–L complete the task.

Next is described the technical advantage of the first embodiment in a simple exemplary situation.

Figure 4:
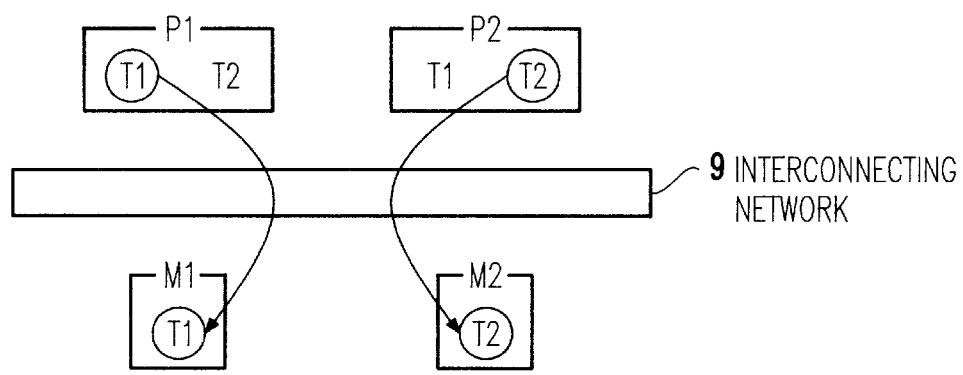
FIG. 4 illustrates the operation of the parallel processing system shown in FIG. 1.

Referring to FIG. 4, the communication register modules M1 and M2 include the communication register sets of tasks T1 and T2, respectively. The processors P1 and P2 execute the tasks T1 and T2, respectively. The processor P1 accesses the communication register module M1. In this situation, the processor P2 can access the communication register module M2, simultaneously and independently. Thus, the first embodiment reduces the contention between a plurality of tasks.

The communication register sets corresponding to different tasks should be located in different communication register modules to maximize the performance of the first embodiment. Next is described the second embodiment of the present invention. The feature of the second embodiment is the address assignment of the communication registers, whereas the other structures and functions are the same as those of the first embodiment.

Figure 5:
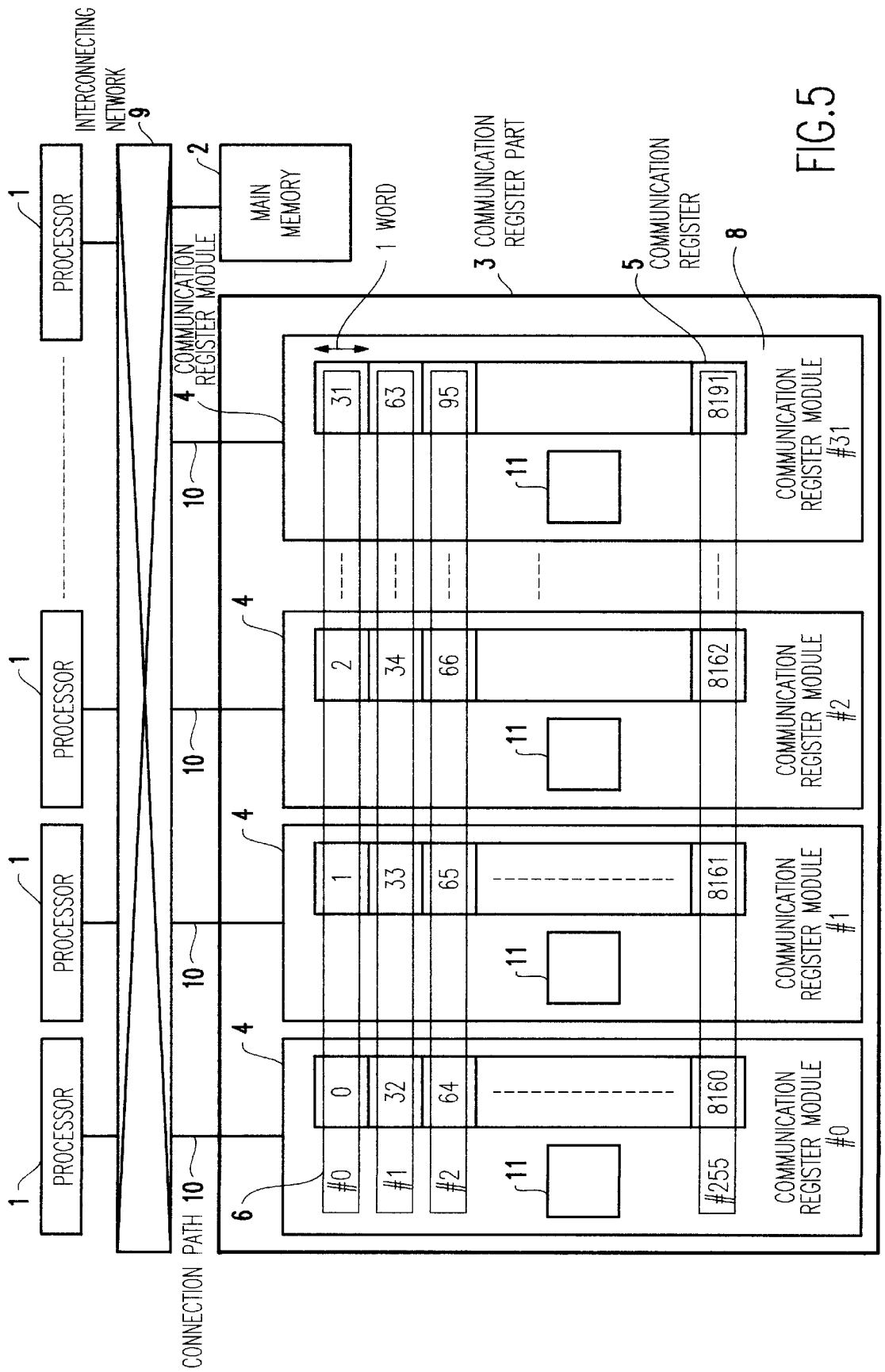
FIG. 5 is a block diagram of a parallel processing system according to a second embodiment of the present invention.

Referring to FIG. 5, in the second embodiment, the address of the communication registers is given below:

$$A(m,p)=M*(p-1)+(m-1) \quad\quad ----(4)$$

where A(m,p) is the address of the p-th communication register of the m-th communication register module (communication register module #(m–1)), and M (=32) is the number of communication register modules 4.

In this specification, this kind of assignment is referred to as an assignment "in a parallel order".

According to the address assignment in a parallel order, the i-th communication register (CR(#i–1)) of the j-th communication register set (#(j–1)) corresponds to the B(i,j)-th word of the C(i,j)-th communication register module. The B(i,j) and C(i,j) values are given below.

$$B(i,j)=j \quad\quad ----(5)$$

$$C(i,j)=i \quad\quad ----(6)$$

Next is described the technical advantage of the second embodiment referring to a simple exemplary situation.

According to the address assignment in a parallel order, communication registers CR(#0) to CR(#31) of a communication register set are located in different communication register modules.

Figure 6:
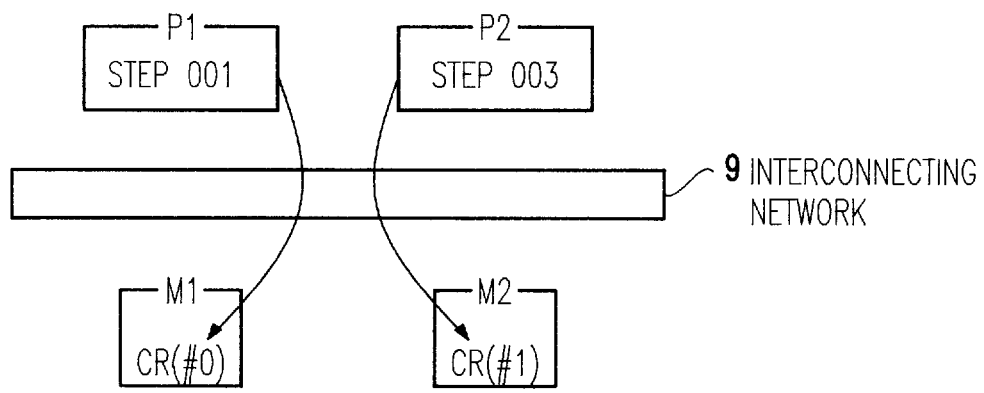
FIG. 6 illustrates the operation of the parallel processing system shown in FIG. 5.

Referring to FIG. 6, a processor P1 executes the test and set instruction on the step 001 of the program shown in FIG. 3. A processor P2 executes the step 003. The lock bit CR(#0) and the counter CR(#1) are located in the communication register modules M1 and M2, respectively. The processor P1 accesses the communication register module M1. In this situation, the processor P2 can access the communication register module M2, simultaneously and independently. Thus, the second embodiment reduces the contention between a processor executing a test and set instruction and a processor processing a critical section.

Next is described the third embodiment of the present invention. The feature of the third embodiment is the address assignment of the communication registers, whereas the other structures and functions are the same as those of the first embodiment.

Figure 7:
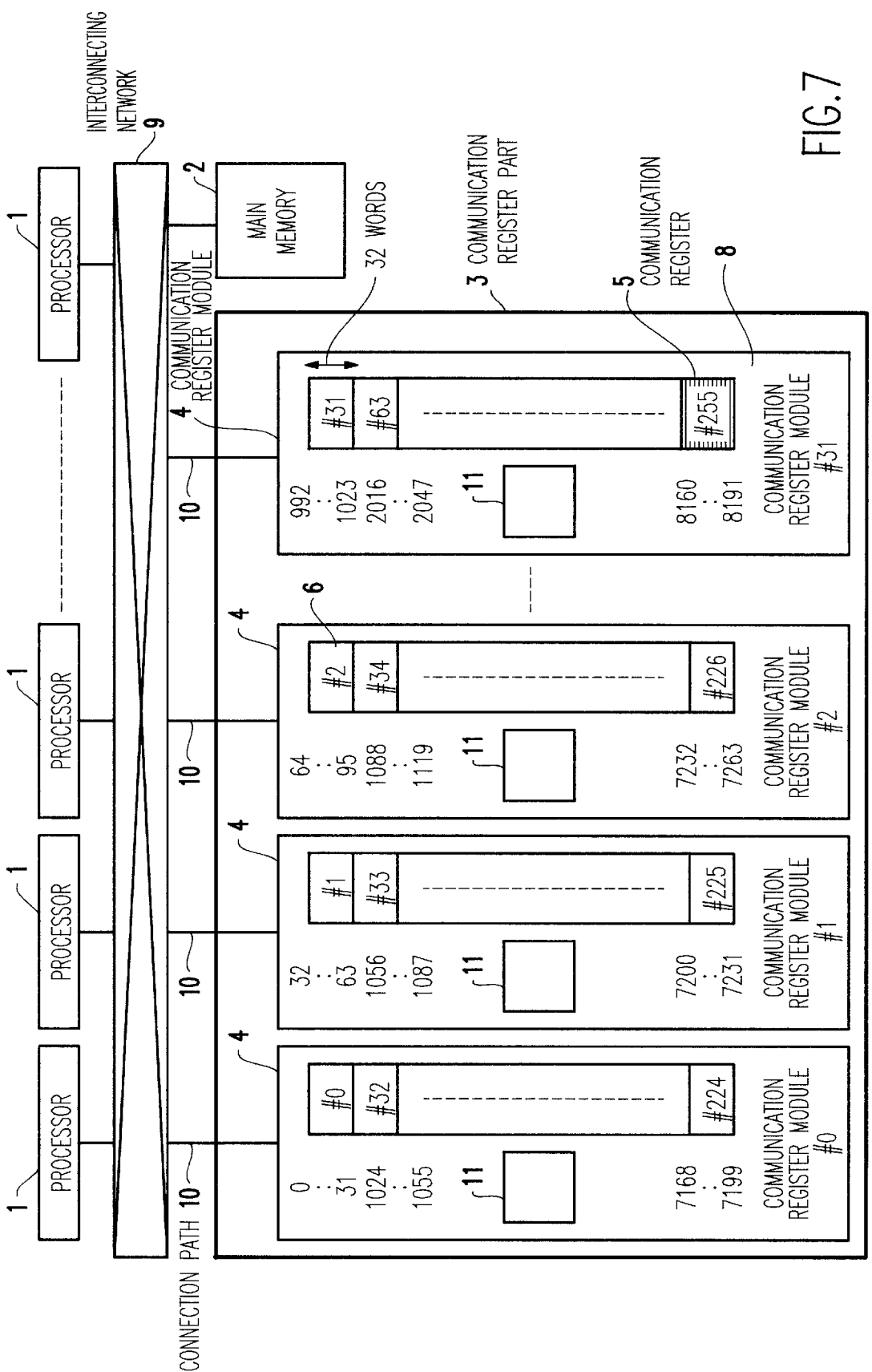
FIG. 7 is a block diagram of a parallel processing system according to a third embodiment of the present invention.

Referring to FIG. 7, in the third embodiment, the address of the communication registers are given below:

$$A(m,p)=\alpha*W*M+(m-1)*W+\beta \quad\quad ----(8)$$

where A(m,p) is the address of the p-th communication register of the m-th communication register module (communication register module #(m–1)), p=$\alpha$*W+$\beta$+1 ($\alpha$ and $\beta$ are integers, 0≦ $\beta$< W), M (=32) is the number of communication registers modules 4, and W (=32) is the number of the communication register in one communication register set.

In this specification, this kind of assignment is referred to as an assignment "in an interleaving order".

According to the address assignment in an interleaving order, the i-th communication register (CR(#i–1)) of the j-th communication register set (#(j–1)) corresponds to the B(i, j)-th word of the C(i,j)-th communication register module. The B(i,j) and C(i,j) values are described as follows:

$$B(i,j)=Q'*W*M+i \quad\quad ----(9)$$

$$C(i,j)=R'+1 \quad\quad ----(10)$$

where (j–1)=M*Q'+R'(Q' and R' are integers, 0≦ R' < M).

The third embodiment is especially advantageous when a plurality of tasks are assigned to contiguous communication register sets because the tasks are naturally assigned to the communication register sets in different communication register modules. Thus, the third embodiment reduces the contention between tasks just as in the first embodiment.

Next is described the fourth embodiment of the present invention. The feature of the fourth embodiment is the address assignment of the communication registers, whereas the other structures and functions are the same as those of the first embodiment.

Figure 8:
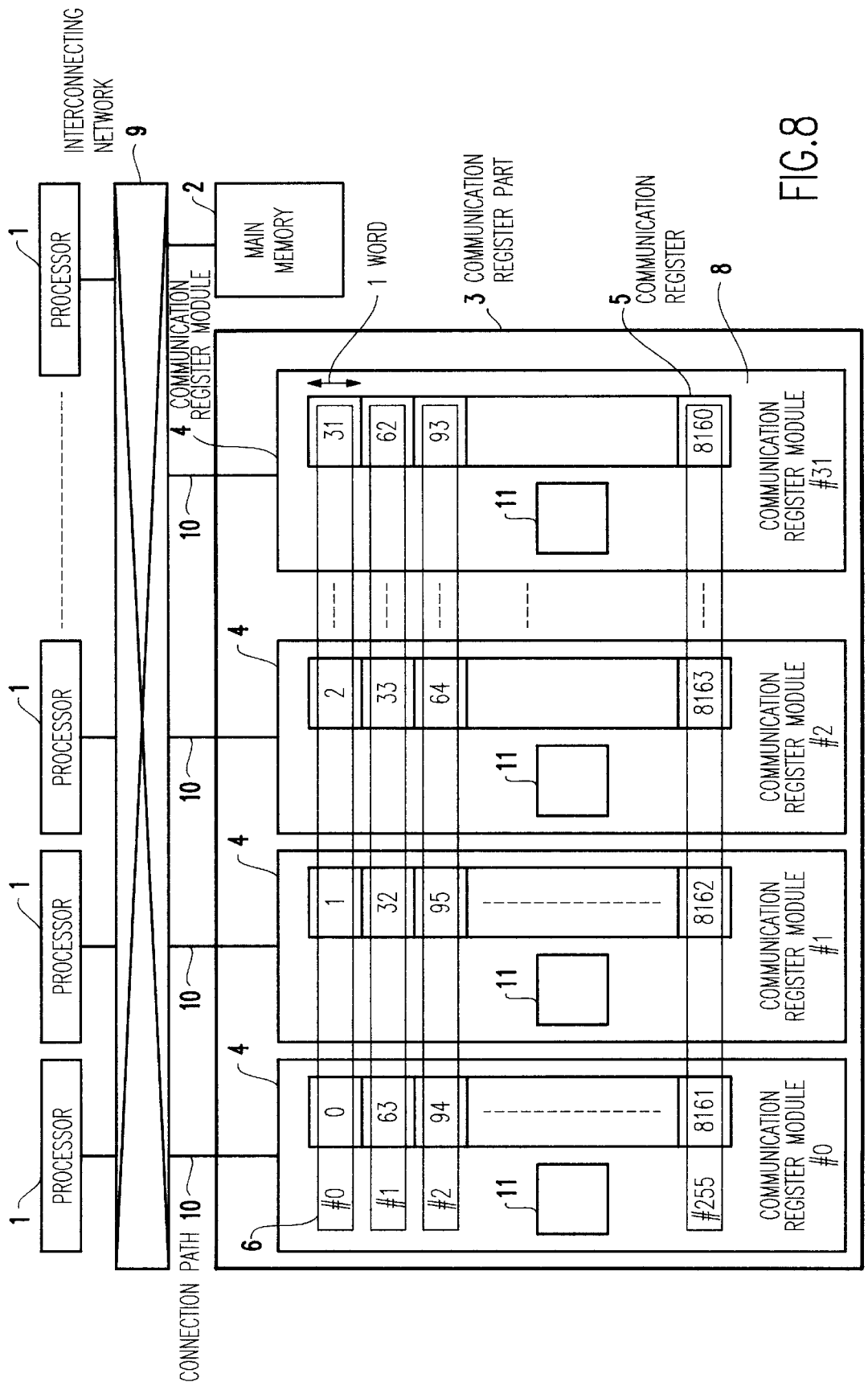
FIG. 8 is a block diagram of a parallel processing system according to a fourth embodiment of the present invention.

Referring to FIG. 8, in the fourth embodiment, the address of the communication registers are given below:

$$A(m,p)=M*p+m-(\delta+1) \quad\quad (if\ m <\delta+1) ----(11)$$

$$A(m,p)=M*(p-1)+m-(\delta+1) \quad\quad (if\ m \geq\delta+1) ----(12)$$

where A(m,p) is the address of the p-th communication register of the m-th communication register module (communication register module #(m–1)), p=$\gamma$*M+$\delta$+1 ($\gamma$ and $\delta$ are integers, 0≦ $\delta$< W), M (=32) is the number of communication register modules 4, and W (=32) is the number of the communication registers in one communication register set.

In this specification, this kind of assignment is referred to as an assignment "in a rotating order".

According to the address assignment in a rotating order, the i-th communication register (CR(#i−1)) of the j-th communication register set (#(j−1)) corresponds to the B(i,j)-th word of the C(i,j)-th communication register module. The B(i,j) and C(i,j) values are given below:

$$B(i,j)=j \quad\quad\quad\quad (9)$$

$$C(i,j)=R'' \quad\quad\quad\quad (10)$$

where (i−1)+(j−1)=M*Q''+R'' (Q'' and R'' are integers, $0 \leq R'' < M$).

In the fourth embodiment, the communication registers CR(#0) to CR(#1) of a communication register set are located in different communication register modules. Thus, the fourth embodiment reduces the contention between a processor executing a test and set instruction and a processor processing a critical section, just as in the second embodiment.

Furthermore, in the fourth embodiment, the lock bits CR(#0) of the communication register sets are distributed evenly over the communication register sets 4. This even distribution of the lock bits reduces the contention between tasks accessing the lock bits, just as in the first embodiment.

Next is described modification of the aforementioned embodiments of the present invention.

First, the counter CR(#1) and/or the data CR(#2) to CR(#31) may be located in the main memory 2 instead of the communication register modules 4.

Second, the present invention can be applied to synchronous/exclusive control methods other than the spin lock described above.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A parallel processing system, comprising:
   a plurality of processors;
   a plurality of communication register modules each including a communication register;
   an interconnecting network for connecting said plurality of processors and said plurality of communication register modules, said interconnecting network for receiving and simultaneously transmitting first and second accesses from first and second processors of said plurality of said processors to first and second communication register modules of said plurality of communication register modules, respectively,
   wherein each of said plurality of communication register modules includes a communication register set, and said communication register set comprises said communication register,
   wherein addresses of said communication register are assigned in an interleaving order.

2. The parallel processing system according to claim 1, wherein interleaving of said addresses is performed in a unit of a communication register set.

3. The parallel processing system according to claim 1, wherein tasks are assigned to said communication register set in respective different ones of said communication register modules, such that each said communication register set corresponds to a respective different task, said tasks being respectively assigned to contiguous ones of communication register sets.

4. A parallel processing system, comprising:
   a plurality of processors;
   a plurality of communication register modules each including a communication register;
   an interconnecting network for connecting said plurality of processors and said plurality of communication register modules, said interconnecting network for receiving and simultaneously transmitting first and second accesses from first and second processors of said plurality of said processors to first and second communication register modules of said plurality of communication register modules, respectively,
   wherein each of said plurality of communication register modules includes a communication register set, and said communication register set comprises said communication register,
   wherein said parallel processing system includes M of said communication register sets, each of said communication register sets includes N of said communication registers, and each of said communication register modules includes W of said communication register sets.
   wherein p=α*W+β+1(α and β, are integers, $0 \leq \beta < W$), and wherein an address A(m,p) of a p-th communication register of an m-th communication register set is $$A(m,p)=\alpha*W*M+(m-1)*W+\beta.$$

5. A parallel processing system according to claim 4, wherein an i-th communication register of a j-th communication register set corresponds to a B(i,j)-th communication register of a C(i,j)-th communication register module,
   wherein (j−1)=M*Q'+R'(Q' and R' are integers, $0 \leq R' < M$), and wherein said B(i,j) and C(i,j) are $$B(i,j)=Q'*W*M+i$$

$$C(i,j)=R'+1.$$

6. The parallel processing system according to claim 5, wherein interleaving of said addresses is performed in a unit of a communication register set.

7. The parallel processing system according to claim 5, wherein tasks are assigned to said communication register sets in respective different ones of said communication register modules, such that each communication register set corresponds to a respective different task, said tasks being respectively assigned to contiguous ones of said communication register sets.

8. The parallel processing system according to claim 4, wherein interleaving of said addresses is performed in a unit of a communication register set.

9. The parallel processing system according to claim 4, wherein tasks are assigned to said communication register sets in respective different ones of said communication register modules, such that each communication register set corresponds to a respective different task, said tasks being respectively assigned to contiguous ones of said communication register sets.

* * * * *